United States Patent [19]
Smith

[11] 3,771,397
[45] Nov. 13, 1973

[54] SLAB GUIDE FOR VERTICALLY ADJUSTABLE SAWING APPARATUS

[75] Inventor: Leward N. Smith, Remus, Mich.

[73] Assignee: Morback Industries Inc., Winn, Mich.

[22] Filed: June 14, 1972

[21] Appl. No.: 263,392

[52] U.S. Cl............... 83/102.1, 83/404.1, 83/404.4, 83/707, 83/425.2, 83/435.1
[51] Int. Cl............................................. B27b 7/02
[58] Field of Search................ 83/102.1, 102, 404.1, 83/404.4, 707, 425.2, 435.1

[56] References Cited
UNITED STATES PATENTS

| 1,574,423 | 2/1926 | Hagmair | 83/102.1 |
| 1,962,329 | 6/1934 | Sly | 83/404.1 |
| 3,374,813 | 3/1968 | Tillery | 83/404.1 |

*Primary Examiner*—Donald R. Schran
*Attorney*—John F. Learman et al.

[57] ABSTRACT

Sawing apparatus comprising a horizontally disposed vertically adjustable, saw assembly for sawing slabs from logs, a slab guide member downstream of a saw blade for vertically guiding a cut slab away from the saw blade, the slab guide member being mounted for concurrent vertical movement with the saw blade so that the slab guide member will always be in position to guide a cut slab vertically away from the saw blade.

12 Claims, 4 Drawing Figures

PATENTED NOV 13 1973 3,771,397

PATENTED NOV 13 1973 3,771,397

SLAB GUIDE FOR VERTICALLY ADJUSTABLE SAWING APPARATUS

FIELD OF THE INVENTION

This invention relates to log sawing apparatus and more particularly to a slab guide for guiding a cut slab away from the log and the saw blade to prevent the slab from binding the saw blade.

BACKGROUND OF THE INVENTION

Operator safety is of major consideration in the sawing of slabs from a log or a board. A saw of the type disclosed herein is relatively large and travels at a relatively high rate of speed, for example, 1,800 revolutions per minute, such that the peripheral speed of the saw blade is approximately 1,100 feet per minute. If a sawed slab inadvertently falls into, instead of away from the high velocity saw blade, the teeth of the blade may catch the slab and propel it at a high rate of speed, injuring anyone in its path.

Devices known as "saw splitters" have been provided in the past and have been mounted downstream of the saws for tipping or pushing the cut slabs away from the saw blades, however, when logs of different sizes are to be sawed, or when slabs of different thicknesses are to be removed, the prior art slab guides must be separately and manually repositioned. This, of course, takes considerable time. Accordingly, it is an object of this invention to provide log sawing apparatus including saw guide apparatus for guiding the cut slabs away from the saw blade and the log being cut and which is concurrently adjustable with the saw blade to accomodate logs of varying sizes.

It is another object of the present invention to provide log sawing apparatus for safely removing edge portions from a board or a log.

Other objects and advantages of the present invention will become apparent to those who are skilled in the art as the description thereof proceeds.

SUMMARY OF THE INVENTION

Apparatus for sawing a log comprising: carriage means for moving a log in a forward path of travel to a log sawing station; generally horizontally disposed saw means at the log sawing station for cutting slabs from logs; means mounting the saw means for vertical movement to adjust to different diameter logs and to adjust the thickness of the slabs being cut; slab guide means downstream of the saw means and extending into the path of slabs being cut for vertically guiding cut slabs away from the saw means to prevent the slabs from binding the saw means; and means mounting the guide means for vertical movement with the saw means to substantially maintain the relative horizontal positions of the slab guide means and the saw means when the saw means is moved vertically.

Apparatus constructed according to the present invention may more readily be described by reference to the accompanying drawings, in which:

FIG. 1 is a sectional top plan view of apparatus constructed according to the present invention, taken on the line 1—1 of FIG. 2, part of the frame being broken away to more clearly illustrate the underlying parts;

FIG. 2 is a side elevational view of apparatus constructed according to the present invention, part of one saw mount being broken away for purposes of more clearly illustrating other portions of the saw mount;

FIG. 3 is a fragmentary, sectional end view, taken along the line 3—3 of FIG. 1, illustrating the relationship of the slab guides and the saw members; and FIG. 4 is an enlarged, sectional side view of the saw blades and slab guides and illustrating the partially severed slab portions moved to positions away from the saw blade by the slab guides.

BRIEF DESCRIPTION OF THE DRAWINGS

Apparatus constructed according to the present invention is generally designated 8 and is supported by a frame, generally designated F (FIG. 3), reciprocally mounting a log supporting carriage, generally designated 10, which supports and moves a log 12 longitudinally in forward and return paths of travel, designated by the arrows $a$ and $b$, respectively in FIG. 1, toward and away from a saw station, generally designated S. A rotatable, vertical circumferentially toothed saw blade 14 is mounted on a frame supported, driven shaft 16 at the saw station S for sawing side edge slabs or boards 18 (FIG. 3) from the log 12. The log supporting carriage 10 includes a carrier 11 supported on frame supported tracks 13 by wheel assemblies 13a and mounting a log support platform 10a which is transversely movable on ways 10b on the carriage 10 toward and away from the vertical saw blade 14 as represented by the arrows $c$ and $d$ (FIG. 3) to adjust the thickness $t$ of the side slab 18 being cut.

The apparatus 8 constructed according to the invention includes edging apparatus, generally designated E, for removing the upper and lower slab portions 22 and 24 from the log 12 and mounted at the saw station S upstream of the vertical saw blade 14, on a frame supported housing, generally designated 25, including top and bottom walls 25a and 25b spanned by a semi-cylindrical sidewall 27. The edging apparatus E includes a pair of circular, rotatable, circumferentially toothed, saw blades 26 having internally splined hub portions 28 slidably received on the externally complimentary splined shaft portions 35, of a vertical shaft 29 journaled in bearings 33 provided on the upper and lower housing walls 25a and 25b. The shaft 29 is driven by a suitable source of power such as an electric motor.

Figure 3:
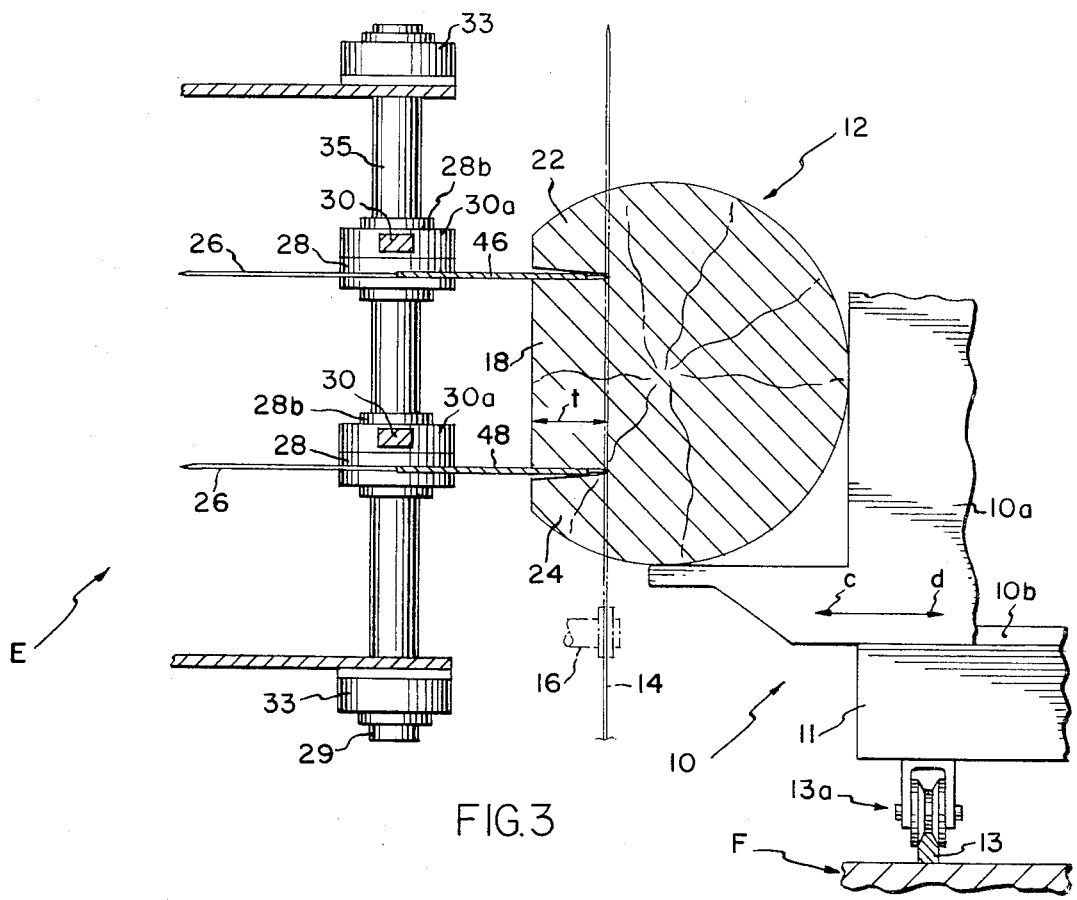
Figure 4:
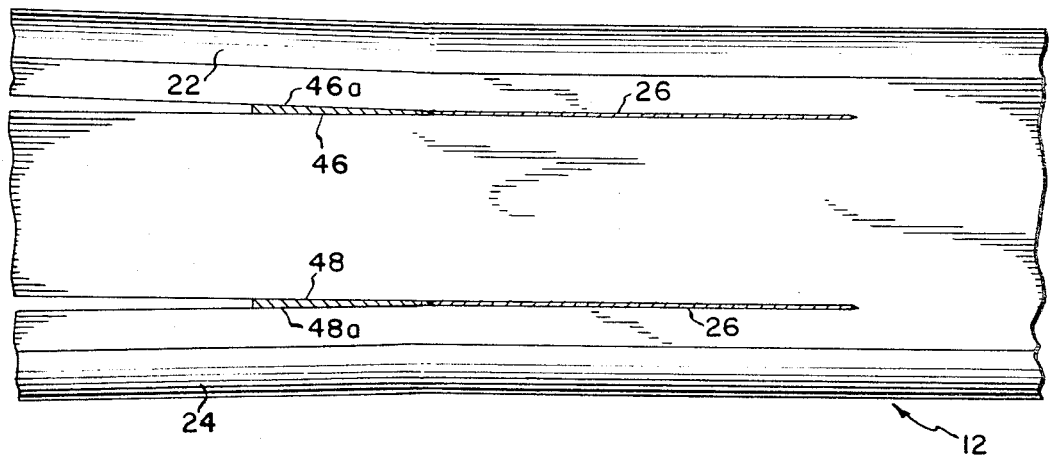

Apparatus is provided for vertically adjusting the horizontally disposed edger blades 26 and includes a pair of vertically spaced saw mounting arms 30 having integral collars 36 slidably received on a vertical, housing supported guide rod 31 and collars 30a received on the axially extending shaft receiving portions 28a of the saw mounting hubs 28. Annular saw-retaining flanges 28b are provided on the shaft receiving portions 28a to support the saw mounting hubs 28 on the collars 30a. The collars 30a and the hubs 28 are suitably lubricated to minimize friction when the saw blades 26 are rotated by the vertical drive shaft 29. As is best illustrated in FIG. 3, the vertical blade 14 lies in a plane tangent to the circumference of the edger blades 26.

Figure 1:
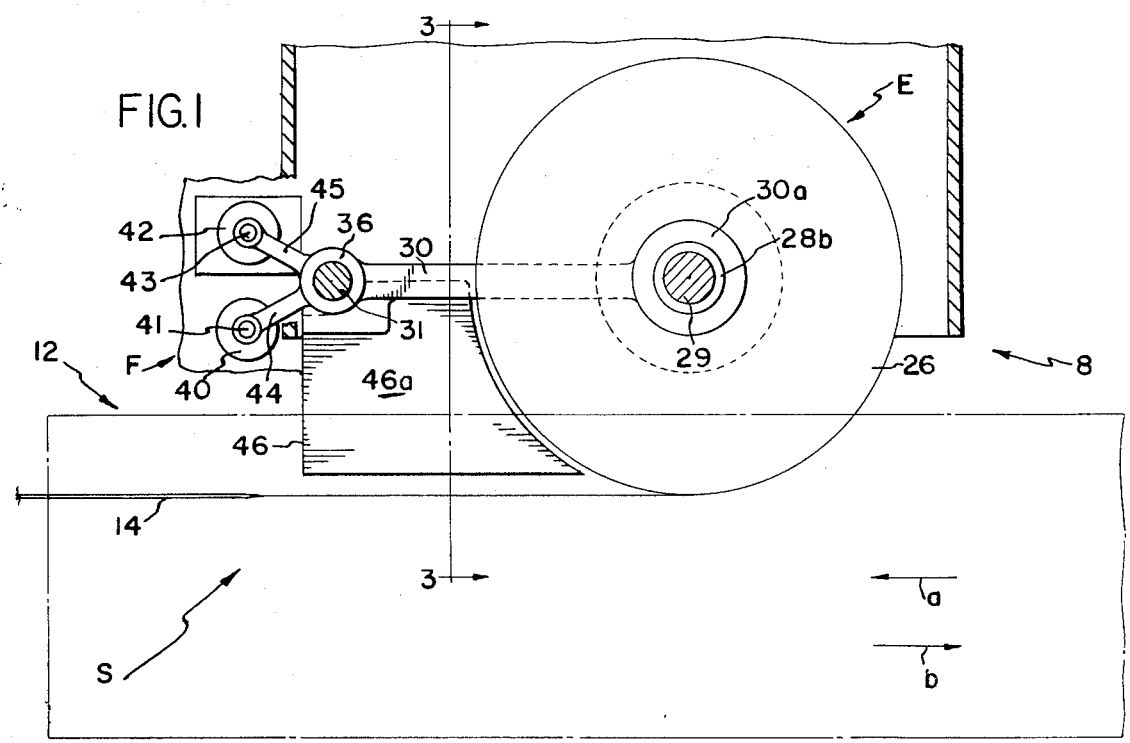
Figure 2:
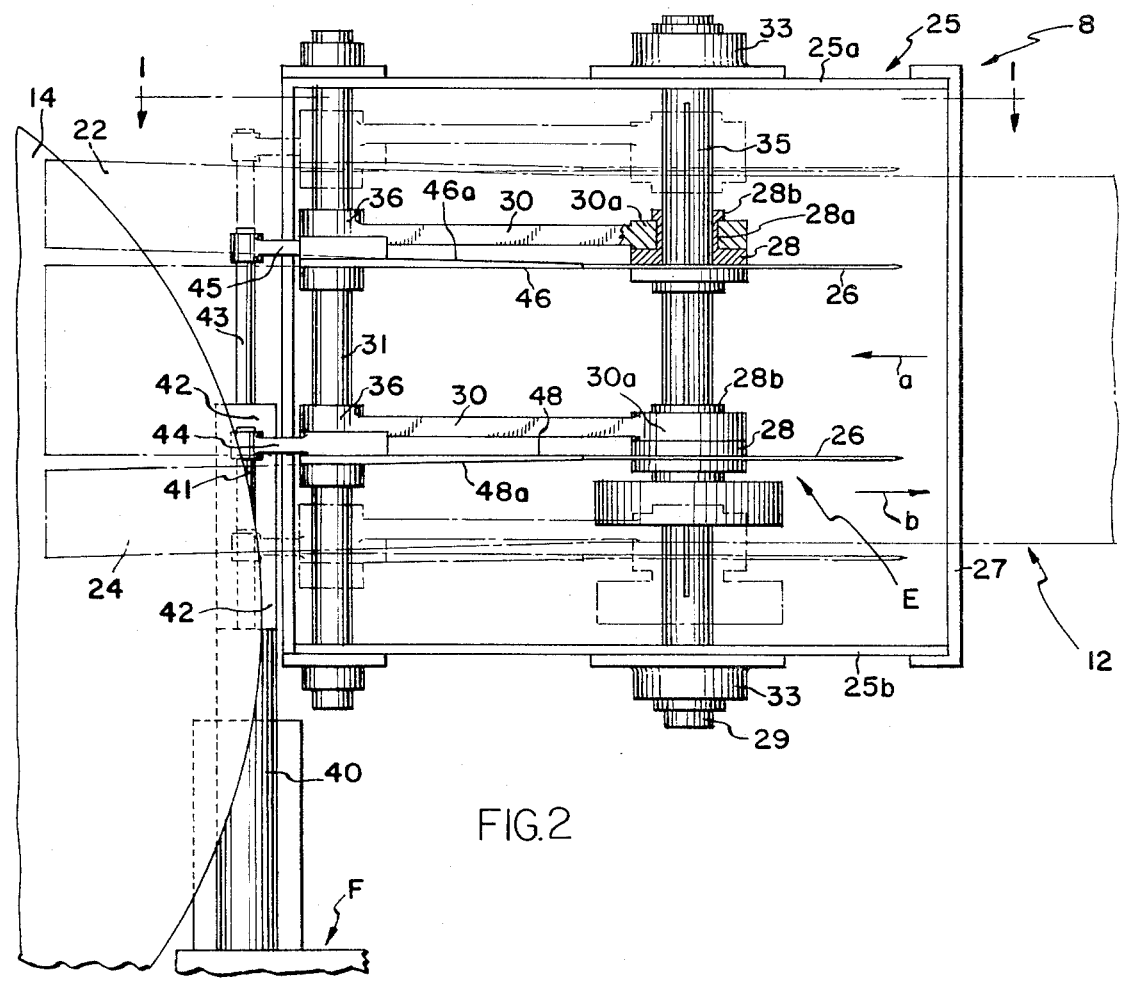

Apparatus for vertically moving the saw mounting arms 30 and the horizontally disposed edger blades 26 between the vertically adjusted positions, illustrated in solid and chain lines, (FIG. 2) comprises a pair of frame supported, double acting, solenoid actuated, fluid operated, cylinders 40 and 42 having piston rods 41 and 43 connected with offset arm portions 44 and 45, respectively of the saw mounting arms 30. As the piston rods 41 and 43 are extended and retracted, the saw blades 26 are moved toward and away from each other.

When a slab portion 22 is cut from the upper portion of the log it will normally tend to be gravity-lowered into binding engagement with the upper saw blade 26. Apparatus is provided for urging the upper slab portion 22 upwardly away from the upper saw blade 26 and comprises a wedge-shaped slab guide plate 46 fixed to the collar 36 of the upper saw support arm 30. The upper guide plate 46 is generally horizontally aligned with the upper saw blade 26 and substantially fills the kerf provided by the upper saw blade 26 and includes an upwardly inclined, top surface 46a engaging the underside of the slab 22 to guide it upwardly, as the log moves forwardly in the direction of the arrow a, away from the upper saw blade 26.

A lower slab guide 48 is fixed to the collar 36 of the lower saw mounting arm 30 and is positioned downstream of, but in horizontal alignment with, the lower saw blade 26. The lower slab guide 26 substantially fills the kerf provided by the lower saw blade 26 and includes a forwardly downwardly inclined bottom surface 48a for bearing against the top side of a lower edge slab portion 24 of the log 12 to urge the lower slab portion 24 downwardly away from the lower saw blade 26. When the upper and lower saw blades 26 are vertically moved toward or away from each other, the upper and lower slab guides 46 and 48 move concurrently therewith toward and away from each other respectively to remain in horizontal alignment with the upper and lower blades 26.

THE OPERATION

A workpiece 12 is positioned on the carriage 10 and fluid is directed to the saw positioning cylinders so as to properly vertically position the horizontal edger blades 26. The vertical side slab cutting saw is positioned tangent to the blades 26 to cut the side slab 18 when the log 12 is moved forwardly in the direction of the arrow a. The saw mounting shafts 16 and 29 are driven to rotate the vertical saw blade 14 and the horizontal edger blades 26. As the log 12 is moved forwardly by the carriage 10, the edger blades 26 partially cut the upper and lower slab portions 22 and 24 from the log 12. The upper and lower slab guide surfaces 46a and 48a of the upper and lower slab guides 46 and 48, which are partially received in the kerfs provided by the saws 26, urge the slabs 22 and 24 vertically away from the saw blades 26 and prevent them from binding the saw blades 26. As the log 12 continues in its forward path, the side slab or board 18 is cut from the log 12 by the vertical blade 14. The blade 14 concurrently severs the remainder of the slabs 22 and 24 from the log 12. After the side slab 18, including the top and bottom slabs 22 and 24, are cut from the log 12, the carriage 10 and log 12 are returned in the direction of the arrow b. The carriage 10 is then moved transversely in the direction of the arrow c (FIG. 3) toward the vertical saw blade 14 a distance equal to the width of the subsequent board to be cut. The carriage 10 is again moved forwardly toward the vertical blade 14 to saw and edge another board 18. The operation is repeated until the log 12 is completely cut.

It is to be understood that the drawings and descriptive matter are in all cases to be interpreted as merely illustrative of the principles of the invention rather than as limiting the same in any way since it is contemplated that various changes may be made in various elements to achieve like results without departing from the spirit of the invention or the scope of the appended claims.

What is claimed is:

1. Apparatus for sawing a workpiece, such as logs and the like, comprising:
   carriage means for moving a workpiece in a forward path of travel to a workpiece sawing station;
   generally horizontally disposed saw means at said workpiece sawing station for at least partially cutting slabs from said workpieces;
   means mounting said saw means for vertical movement to adjust to different diameter workpieces and to adjust the thickness of the slabs being cut;
   slab guide means downstream of said saw means and extending into the path of slabs being cut for vertically guiding cut slabs away from said saw means to prevent said slabs from binding said saw means; and
   means mounting said guide means for concurrent vertical movement with said saw means to substantially maintain the relative horizontal positions of said slab guide means and said saw means when said saw means is moved vertically.

2. The apparatus of claim 1 wherein said slab guide means includes a portion in horizontal alignment with the saw means and disposed in the kerf cut by said saw means for vertically guiding the cut slabs away from the saw blade.

3. The apparatus set forth in claim 1 wherein said saw mounting means includes a vertical guide rod, a saw means support member slidably mounted on said guide rod for vertical movement, and means on said support member rotatably supporting said saw means; said means mounting said guide means and saw means for concurrent vertical movement comprising a guide means support member fixed to said saw means support member and said guide means.

4. The apparatus set forth in claim 1 wherein said saw means comprises vertically spaced circular saw members and said slab guide means comprises vertically spaced guide members horizontally aligned with said saw members.

5. The apparatus set forth in claim 4 including means for independently vertically moving each saw member and the aligned slab guide member.

6. The apparatus set forth in claim 1 wherein said saw means comprises a generally horizontally disposed saw blade, said slab guide means including means inclined vertically forwardly away from said saw means to guide the cut slabs vertically away from the workpiece and said saw means.

7. The apparatus set forth in claim 6 wherein said slab guide means comprises a kerf filler having a portion adjacent said saw means of a thickness corresponding to the kerf width of the saw means and a portion downstream of an increased vertical thickness.

8. The apparatus of claim 1 wherein said saw means comprises circular saw means, said saw mounting means comprises a vertical support shaft and means mounting said circular saw means for axial movement thereon and for rotary movement therewith.

9. The apparatus set forth in claim 1 wherein said horizontal saw means includes vertically spaced, horizontal saw members for providing vertically spaced kerfs in said workpiece along one side thereof; and vertical saw means is provided downstream of said slab guide means in a plane tangent to said circular saw members for cutting a board from the workpiece portion between the vertically spaced kerfs.

10. Apparatus as set forth in claim 9 wherein said slab guide means extends into the path of slabs being cut for vertically guiding the cut slabs away from the workpiece.

11. The apparatus set forth in claim 10 wherein said slab guide means includes a portion in horizontal alignment with said saw means and disposed in the kerf cut by said saw means and a portion downstream thereof for vertically guiding the cut slabs away from the workpiece.

12. The apparatus set forth in claim 1 including vertical saw means disposed downstream and in a plane generally tangent to said horizontally disposed saw means for cutting a board from said workpiece; said horizontally disposed saw means comprising edger means for removing slabs from at least one vertical edge portion of said board.

* * * * *